Aug. 16, 1927.
P. BAAR
POULTRY PERCH
Filed Aug. 4, 1924
1,639,020
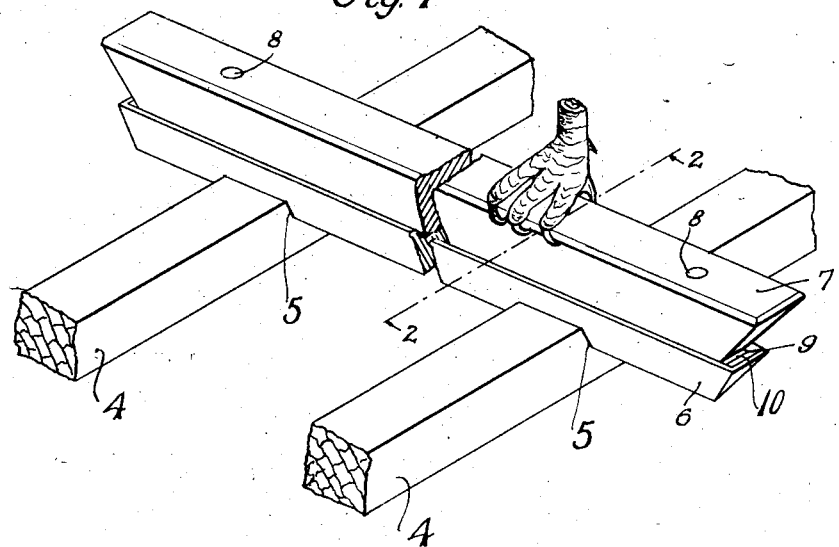
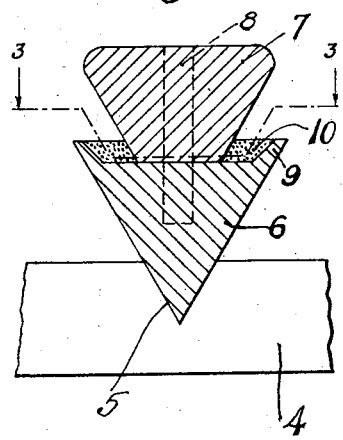
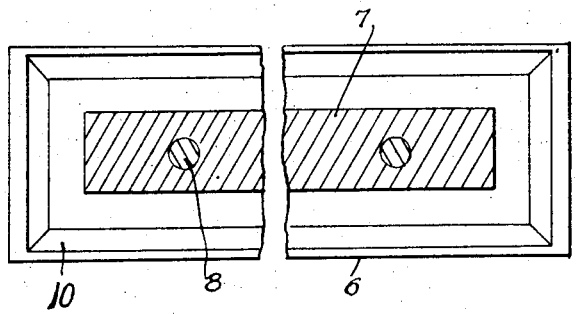
Inventor
Peter Baar
By Brown, Boettcher & Diemer
Attys.

Patented Aug. 16, 1927.

1,639,020

UNITED STATES PATENT OFFICE.

PETER BAAR, OF ZEELAND, MICHIGAN.

POULTRY PERCH.

Application filed August 4, 1924. Serial No. 729,867.

My invention relates to a poultry perch, and its object is to provide a perch whereby the poultry roosting thereon may be protected against vermin.

My improved perch is illustrated in the accompanying drawing, in which—

Figure 1 is a perspective view thereof;

Figure 2 is a cross-sectional view thereof; and

Figure 3 is a horizontal sectional view taken on the plane of the line 3—3 of Figure 2.

The perch structures are supported on racks 4 of which there may be any number. Each perch structure comprises the lower supporting bars 6 and the upper or perch bar 7. The lower bar 6 is of triangular cross section and seats along one of its edges in the V-shaped notches 5 cut in the racks 4, the opposite side of the bar being at the top and horizontal. The perch bar is of generally V-shape cross section and is secured to the lower bar by means of dowel pins 8.

The lower bar 6 is depressed at its upper side to form the trough 10 with the surrounding flange or rim 9. The perch bar rests at the middle of this depression or trough in which any suitable vermicide is placed so that the perch bar will be entirely surrounded by and within the vermicide along its base. Owing to the cross sectional shape of the perch bar its inclined sides will overhang the trough to be in the path of fumes rising from the materials in the trough, and preferably the ends of the perch bar are cut away so that they will also overhang the trough and the materials therein, as clearly shown in Figure 1.

The inclined sides and ends of the perch bars make it very difficult for insects or vermin to crawl upwardly and the same is true in connection with the lower bars 6 whose sides and ends are likewise inclined. Poultry perched on the perch bars will therefore be fully protected.

I claim:

1. A poultry perch structure comprising supporting bars having aligned V notches, a strip of triangular cross-section seating in said notches along one of its edges and having a flat side up, said flat side being depressed to form a trough for containing vermicide, a perch bar of generally V-shaped cross-section mounted on said strip to be entirely within said trough, the inclined sides of said perch bar overhanging said trough to be in the path of fumes arising from the vermicide in said trough.

2. A poultry perch structure comprising supporting bars having aligned V notches, a strip of triangular cross-section seating in said notches along one of its edges and having a flat side up, said flat side being depressed to form a trough for vermicide, a perch bar of generally V-shaped cross-section mounted on said strip within the sides of the trough, the inclined sides of said perch bar overhanging the trough to be in the path of fumes rising from the material in said trough, the ends of said bar being also cut away in order to overhang the trough and the material therein.

In witness whereof, I hereunto subscribe my name this 2nd day of August, 1924.

PETER BAAR.